United States Patent [19]
Tomita

[11] Patent Number: 5,478,023
[45] Date of Patent: Dec. 26, 1995

[54] TAPE DRIVING APPARATUS

[75] Inventor: Seiji Tomita, Kanagawa, Japan

[73] Assignee: Kabushiki Kaisha Toshiba, Kanagawa, Japan

[21] Appl. No.: 73,461

[22] Filed: Jun. 9, 1993

[30] Foreign Application Priority Data

Jun. 12, 1992 [JP] Japan .................. 4-153473

[51] Int. Cl.⁶ .................................. G11B 15/32
[52] U.S. Cl. ........................................ 242/356.6
[58] Field of Search ................... 242/186, 189, 242/201, 202, 203, 204, 207, 210; 360/96.2, 96.3, 96.4

[56] References Cited

U.S. PATENT DOCUMENTS

| | | | |
|---|---|---|---|
| 3,498,571 | 3/1970 | Dilling et al. | 242/203 |
| 4,139,169 | 2/1979 | Kono | 242/201 |
| 4,162,829 | 7/1979 | Cook et al. | 242/186 X |
| 4,346,859 | 8/1982 | Osanai | 242/186 X |
| 4,437,129 | 3/1984 | Yoshida et al. | 360/96.4 X |
| 4,630,149 | 12/1986 | Ida | 360/96.3 X |
| 4,635,868 | 1/1987 | Jacobson | 242/186 X |
| 4,709,871 | 12/1987 | Tanaka et al. | 242/201 X |

FOREIGN PATENT DOCUMENTS 58-15854  3/1993  Japan .

Primary Examiner—Daniel P. Stodola
Assistant Examiner—John P. Darling
Attorney, Agent, or Firm—Banner & Allegretti, Ltd.

[57] ABSTRACT

A mechanism for controlling tension of a magnetic tape during transfer from a take-up reel to a supply reel, wherein the mechanism includes a supply reel assembly and a tape tension regulator detecting the tension. The reel assembly involves a brake drum, an input gear with a friction felt, planet gears and a reel boss with a sun gear. According to a tape tension, the regulator supplies a brake force Tb to the brake drum. The planet gear which is interlocked with the brake drum transmits a drive torque to the reel boss via the sun gear according to the brake force Tb. The input gear transmits a constant torque Tt to the reel boss by means of friction of the felt. The reel boss is rotated for winding the tape with a torque which equals Tt and Tb (Z1/Z2) where Z1 is the number of cogs of the brake drum and Z2 is the number of cogs of the sun gear.

20 Claims, 3 Drawing Sheets

TAPE DRIVING APPARATUS

BACKGROUND OF THE INVENTION

This invention relates in general to a tape driving apparatus and, particularly to a magnetic tape recording and/or reproducing apparatus, such as a video cassette recorder (VCR for short), and more particularly it relates to a mechanism for controlling the tape tension while the tape is running and winding around a reel.

Conventionally, a VCR has two reels on which hubs of a tape cassette are placed, and in this state a magnetic tape is drawn out of the cassette and it is bound about a cylinder. In any forward mode, such as a recording mode, a reproducing mode or a East forward mode, both reels rotate for supplying the tape from one of the reels, which is defined as a supply reel (S-reel), and simultaneously for winding the tape around the other reel which is defined as a take-up reel (T-reel). These names of the reels are not exchanged with each other even if operation occurs in a reverse mode.

When the tape is running in a normal direction, namely in the forward mode, torque of the S-reel is controlled by a brake mechanism which touchs the S-reel to regulate a rotational speed of the S-reel in response to the tape tension, so that the tape tension remains constant.

On the other hand, when the tape is running in the reverse direction, namely in the reverse mode, for example, in a reverse reproducing mode or a rewind mode, the brake mechanism is removed from controlling the torque of the S-reel, because it functions to not make the tape tension constant but instead to increase the deflection of the tape tension in the reverse mode. Instead a slip mechanism included in the S-reel regulates the reel torque to be constant. However, the tape tension is in inverse proportion to the winding radius which corresponds to the thickness of the tape which has been wound around the reel, so the tape tension changes about two or three times from the beginning to the end of being wound around S-reel. Therefore, although the torque of the S-reel is constant, the tape tension changes, and such change brings about various inconvenient effects. For example, if the tape tension is too high, the tape is liable to be damaged and magnetic heads may be abraided. On the other hand, if the tape tension is too low, the contact between the tape and the head becomes so loose as to make the quality of the reproducing signal bad.

A well-known arrangement for maintaining a constant tape tension in the reverse mode is to exclusively supply a high quality drive motor for rotating the S-reel and to detect the winding radius by certain sensor means so as to control the motor according to the result of the detection. While such arrangement has proven its effectiveness with regard to the tape tension, it has suffered the disadvantage of being complex in construction, difficult to manufacture and high in cost.

SUMMARY OF THE INVENTION

In accordance with this invention, in a reverse mode, a drive force for rotating a S-reel is converted into a first torque transmitted to the S-reel. A brake force in response to tension of a tape is generated. The brake force is also coverted into a second torque which is in inverse proportion to the tape tension and transmitted to the S-reel. The S-reel is driven by a torque proportional to the first torque and the second torque. As a result, the tape tension is maintained at a constant level in the reverse mode.

It is an object of the present invention to provide a tape driving apparatus which is not subject to the abovementioned problem and disadvantage.

It is an also object of the present invention to provide an improved tape tension control mechanism which is suitable for being employed for a magnetic recording and/or reproducing apparatus, and which operates accurately in a reverse mode.

Another object of the invention is to provide a low cost tape tension control mechanism which has a reduced number of component parts and is easy to manufacture.

A further object of the invention is the provision of a tape tension control mechanism having good performance, and which contributes to raise the endurance of the tape and heads.

Other and further objects of this invention will become obvious upon an understanding of the illustrative embodiment about to be described or will be indicated in the claims, and various advantages which are not referred to herein will occur to one skilled in the art upon employment of the invention in practice.

DETAILED DESCRIPTION OF THE INVENTION

Figure 1:
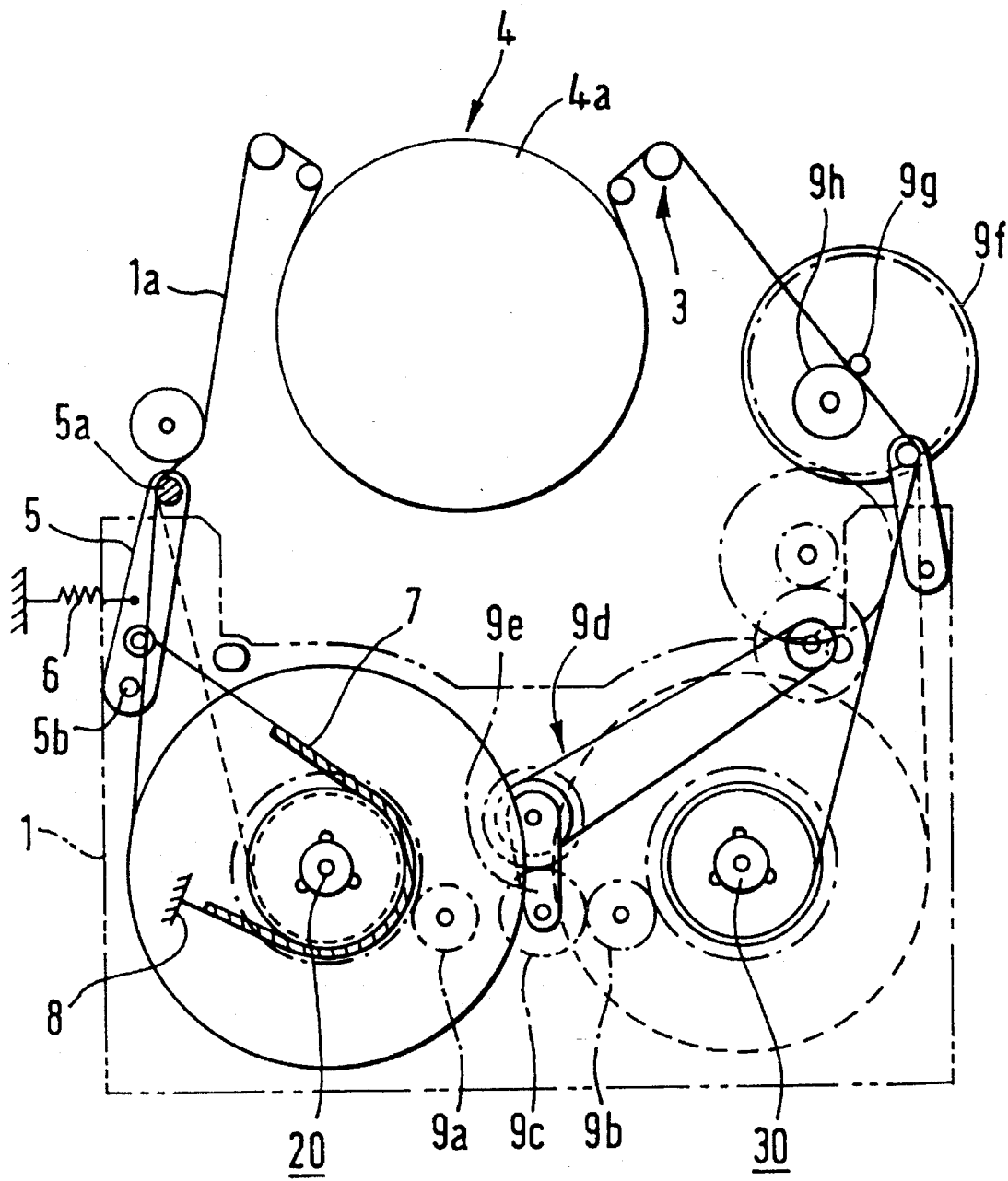
FIG. 1 a schematic plan view showing an interior construction of a VCR suitable for utilizing the novel tape tension control mechanism of the present invention.

As shown in FIG. 1, a VCR has a S-reel assembly 20 and a T-reel assembly 30. Two hubs of a tape cassette 1 are placed on both reels. A magnetic tape 1a is drawn out of the cassette 1 by a tape loading mechanism 3 and it is bound about a cylinder assembly 4a mounted on a recording and reproducing section 4. In this state, the tape 1a runs according to the rotation of a capstan 9g, the S-reel 20 and the T-reel 30. A tension regulator 5 is positioned near the S-reel 20 and it has a tension post 5a at one end thereof with which the tape 1a is in contact. The tension regulator 5 is rotatable in response to the tension of the tape 1a around a pivot 5b which is secured on a chassis and positioned at the other end of regulator 5. A spring 6 is joined between the middle portion of the tension regulator 5 and the chassis 8, and it supplies force for rotating the regulator 5 counterclockwise if the tape tension is lower than a predetermined level. A band brake 7 is trained over the S-reel assembly 20 from a portion of the tension regulator 5 to the chassis 8. A control slider, not shown, is connected with the tension regulator 5 and it is able to turn the regulator 5 clockwise for removing it from the tape 1a according to the operation by a mode switching mechanism.

The S-reel assembly 20 and the T-reel assembly 30 have their respective gearworks which gear with a first relay gear 9a and a second relay gear 9b, respectively. A drive gear 9c is positioned between both relay gears 9a, 9b and it is pivotally supported by an idle arm 9e to interlock with either relay gear 9a or 9b and to transmit a rotational force to the relay gear. The drive gear 9c is supplied with the rotational force from a reversible capstan motor 9f through a gear transmission 9d. Thus the drive gear 9c is pivoted clockwise or counterclockwise by the idle arm 9e and interlocked with the first relay gear 9a or the second relay gear 9b in response to the direction of the rotation of the capstan motor 9f, so that it drives either relay gear. The numeral 9h indicates a pinch roller.

According to the structure drawn in FIG. 1, in the forward mode, such as the reproducing mode, the drive gear 9c is pivoted counterclockwise, so that the rotational force of the capstan motor 9f is transmitted to the second relay gear 9b via the gear transmission 9d and the drive gear 9c. The T-reel assembly 30 rotates clockwise, so that the tape 1a is transferred from the S-reel side to the T-reel side. In this state, the tension regulator 5 responds to the tension of the tape 1a. Namely, when the tape tension is higher than a predetermined level, the tension regulator 5 turns clockwise against the force of the spring 6, and the band brake 7 comes to be loosely linked about the S-reel assembly 20, so that the brake torque of the S-reel 20 decreases in order to lower the tape tension. Oppositely, when the tape tension is lower than the predetermined level, the regulator 5 turns counterclockwise in response to the force of the spring 6, and the band brake 7 comes to be tightly linked, so that the brake torque of the S-reel 20 increases in order to raise the tape tension. Thus, the tape tension is maintained at a constant level in the forward mode.

Figure 2:
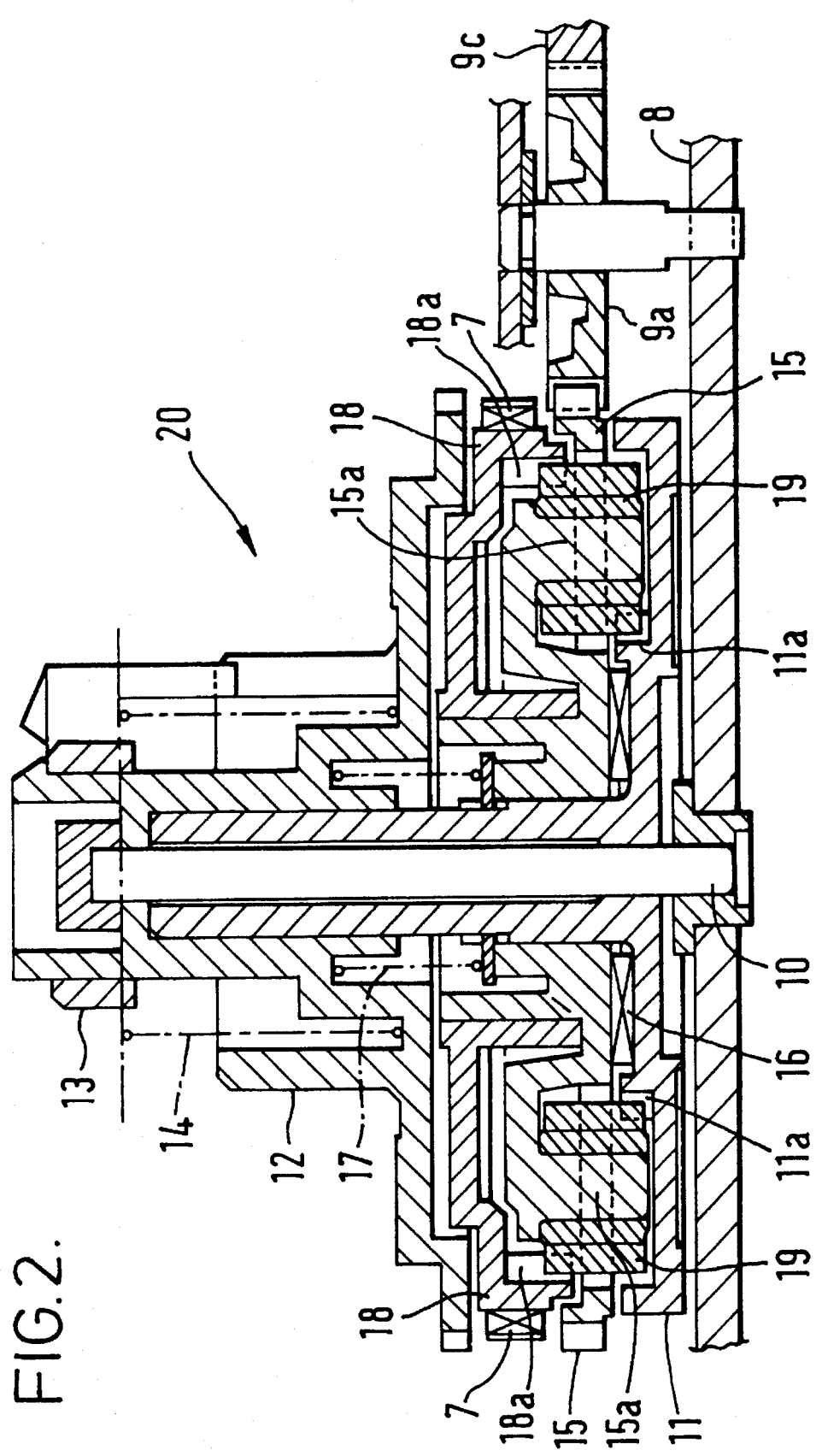
FIG. 2 a vertical sectional view of a reel assembly characterized by an embodiment of this invention.

Prior to explanation of the operation in the reverse mode, referring now to FIG. 2, there is illustrated an embodiment of the S-reel assembly 20. A reel shaft 10 is mounted on the chassis 8. A reel boss 11 formed like a disc is rotatably mounted on the shaft 10, and a reel table 12 is fixed on the central top thereof for rotating together. A reel hub 13 is provided on the reel table 12, as it is able to shift in an axial direction because it is supported by a spring 14 mounted on the reel table 12. The reel hub 13 is interlocked to and transmits rotational force to a supply hub of the tape cassette, and they rotate together for supplying or rewinding the tape.

An input disc gear 15 is independently and rotatably mounted on the reel boss 11, and has an circular friction felt 16 attached on the bottom thereof. The felt 16 is pressed against a low table portion of the reel boss 11 by a spring 17 provided between the reel table 12 and the input gear 15. Therefore the felt 16 generates a brake force to supply necessary torque as a backtension for the reel boss 11 in the forward mode, while it also generates the drive force to make the reel boss 11 rotate by means of the friction caused by the felt 16 between the reel boss 11 and input gear 15 in the reverse mode. The felt 16 can instead be attached to the table of the reel boss 11, so it is aligned to contact with a confronting portion of the input gear 15.

The input gear 15 supports a plurality of planet gears 19, there being three such planet gears in this embodiment, which are rotatably mounted respectively on axles 15a formed on the input gear 15 at the equally spaced intervals. These planet gears 19 are respectively geared with a sun gear 11a formed on the reel boss 11. Meanwhile a brake drum 18 is independently and rotatably mounted on the input gear 15, and the band brake 7 is bound thereabout as shown in FIG. 1. This brake drum 18 has an inner gear 18a about the inner circumference thereof, and the inner gear 18a is interlocked with all of the planet gears 19.

The input gear 15 is connected with, and it is supplied the rotational force from, the first relay gear 9a which is interlocked with the drive gear 9c shown in FIG. 1 in the reverse mode. Therefore the input gear 15 is rotated counterclockwise from a viewpoint in FIG. 1 by means of the transmission of the rotational force from the capstan motor 9f via the gear transmission 9d, the drive gear 9c and the first relay gear 9a.

The operation in the reverse mode of this embodiment illustrated in FIG. 1 and 2 will now be explained. Upon switching to the reverse mode, such as for reverse reproducing or rewinding, the drive Gear 9c is pivotally moved to interlock with the first relay Gear 9a and to transmit the rotational force from the capstan motor 9f to the input Gear 15 of the S-reel assembly 20, so that the input Gear 15 rotates counterclockwise in FIG. 1. While the tape 1a is running from the T-reel side to the S-reel side, the tension regulator 5 is activated in the same manner as in the operation in the forward mode. If the tape tension is lower than a predetermined level, the tension regulator 5 turns counterclockwise, and the band brake 7 comes to be tightly linked about the brake drum 18, thus the brake drum 18 is provided with the brake force Tb in response to the tape tension detected by the tension regulator 5.

When the input Gear 15 is rotating counterclockwise, simultaneously the planet Gears 19 are revolving around the sun Gear 11a in the same direction. At the same time, each planet Gear 19 rotates clockwise about its axle 15a because the brake drum 18 Geared with them is restrained from rotating when the tape tension is low. Each planet Gear 19 transmits its own rotational force to the reel boss 11 for rotating it counterclockwise via the sun Gear 11a, in addition to the drive torque Tt which is caused by the friction of the felt 16 to make the reel boss 11 follow the rotation of the input Gear 15. Accordingly, when the tape tension is low, a rotational speed in a counterclockwise direction of the S-reel assembly 20 increases, namely the torque T of the S-reel increases, so that the tape tension increases.

The torque T is represented by the following formula. The symbols Z1 and Z2 are defined as numbers of the cogs of the inner gear 18a formed on the brake drum 18 and the sun gear 11a formed on the reel boss 11, respectively.

$T=Tt+Tb.(Z1/Z2)$

On the other hand, when the tape tension is higher than the predetermined level, the tension regulator 5 turns clockwise, and the band brake 7 comes to be loosely linked about the brake drum 18, so that the brake force Tb decreases. Thus the torque T of the S-reel also decreases, so that the tape tension decreases. The planet gears 19 do not rotate when the drum 18 is not restrained.

Figure 3:
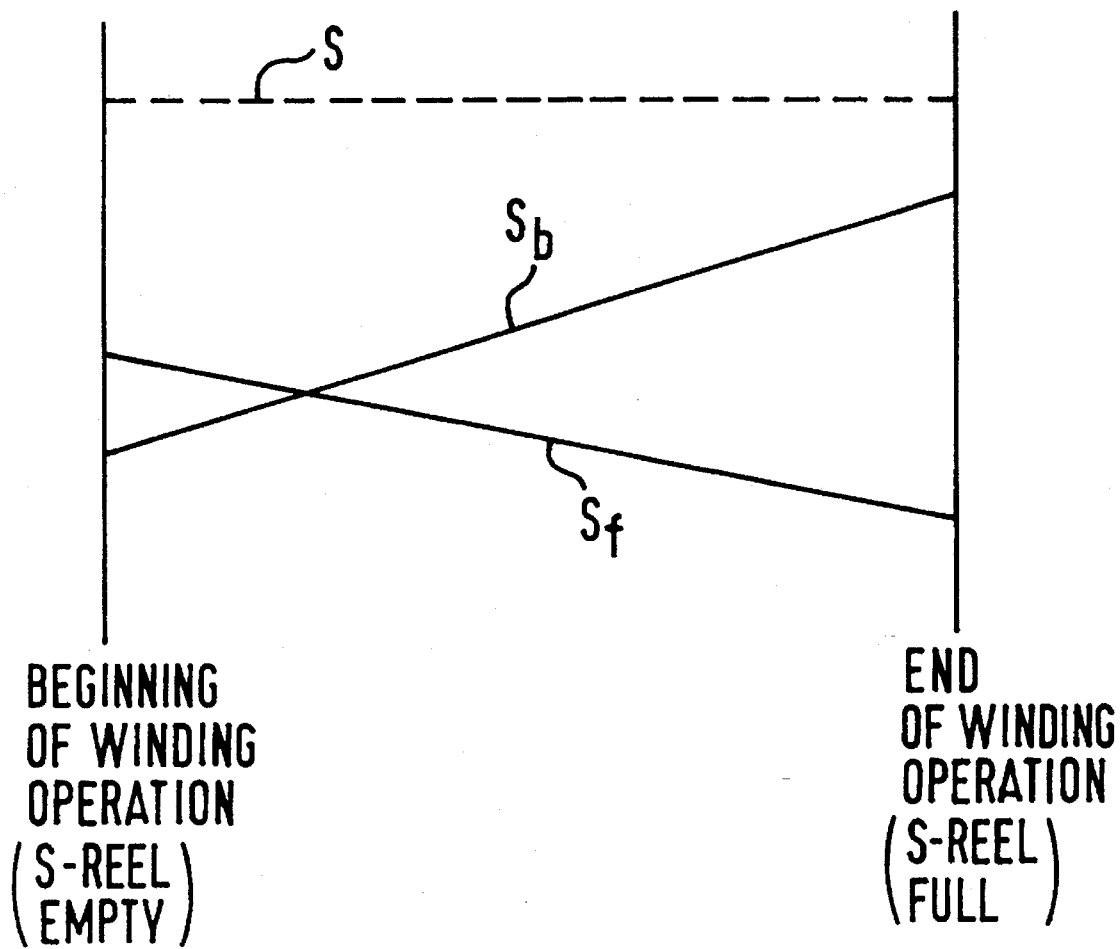
FIG. 3 is a graph showing the relation between a tape tension and a winding radius.

FIG. 3 shows the relation between the tape tension and the winding radius of the S-reel in the reverse mode of this embodiment. If only the drive force transmitted by the friction felt 16 works for producing the torque of the S-reel, a tape tension Sf based only thereon decreases in inverse relation to the winding radius, because the drive force is constant. However, according to the decrease of the tape tension Sf, the brake force by the band brake 7 increases, and the drive force by the planet gears 19 also increases, so that the tape tension Sb based thereon increases. Therefore a actual tape tension S which equals St plus Sb is maintained at a constant level.

When the tape 1a is unloaded from the recording and reproducing section 4 shown in FIG. 1 and it is drawn into the tape cassette 1, the tension regulator 5 is forced to turn clockwise by the control slider, not shown, so that the band brake 7 is removed from controlling the brake drum 18. Accordingly, the S-reel is rotated counterclockwise for rewinding the tape 1a by means of only the drive force caused by the friction felt 16.

In accordance with another embodiment, it will be effective that a control mechanism involving a tension regulator, a band brake and a reel assembly which are similar to those shown in above embodiment, could be utilized for the T-reel side as well as the S-reel side. Also a magnet can be provided as means for driving the reel instead of the felt 16 and the spring 17. Further a sun gear can be formed on the brake drum and an outer gear interlocked with planet gears can be formed on the reel boss. Additionally, the number of the planet gears is not limited to three, so it will be practical even if one planet gear is used.

While tape driving apparatus has been disclosed for application is magnetic tape recording and/or reproducing apparatus, those skilled in the art will now recognize the utility of the present invention to other types of tape driving apparatus unrelated to magnetic tape applications.

As set forth hereinabove, the present invention provides a tape tension control mechanism by which the tape tension is maintained at a constant level during the reverse mode and number of component parts is reduced so as to be easy to manufacture, and which contributes to improve endurance of a magnetic tape and heads because the tape tension is regulated in the reverse mode.

While a preferred embodiment has been described, variations thereto will occur to those skilled in the art within the scope of the present inventive concepts which are delineated by the following claims.

What is claimed is:

1. Tape driving apparatus having a supply reel and a take-up reel for winding a tape transferred between both the reels, the apparatus comprising:

forward drive means associated with said take-up reel for transferring the tape from said supply reel to said take-up reel in a forward direction by rotating the take-up reel;

reverse drive means associated with the supply reel for transferring the tape from the take-up reel to the supply reel in a reverse direction by rotating the supply reel;

first control means including an input gear and a friction element disposed between the input gear and the supply reel for receiving a first force supplied from the reverse drive means and for converting the first force into a first torque transmitted to the supply reel;

tension detecting means positioned near the supply reel and in contact with the tape for generating a second force in response to tension of the tape during the transfer in the reverse direction; and second control means for converting the second force into a second torque in inverse proportion to the tape tension and for transmitting the second torque to the supply reel;

wherein the supply reel is driven by a torque proportional to the first torque and the second torque.

2. Apparatus as claimed in claim 1, wherein the second control means includes at least one planet gear and a pair of gears as a sun gear and an inner gear meshed with the planet gear, one of the pair of gears is coupled to receive the second force from the tension detecting means and the other of the pair transmits as the second torque a torque caused by the planet gear to the supply reel.

3. Apparatus as claimed in claim 1, wherein the tension detecting means also generates the second force in response to tension of the tape during the transfer in the forward direction.

4. Apparatus as claimed in claim 1, wherein said first control means transmits the first torque to drive the supply reel when the reverse drive means is activated, and transmits the first torque to brake the supply reel when the forward drive means is activated.

5. Apparatus as claimed in claim 4, wherein the first control means transmits the first torque by means of friction.

6. Apparatus as claimed in claim 1, wherein the tape is a magnetic tape.

7. Apparatus as claimed in claim 1, said input gear mounted about said supply reel and said friction element comprising friction felt.

8. Apparatus as claimed in claim 1, said input gear mounted about said supply reel and said reverse drive means comprising a drive gear and a relay gear, said relay gear interlocked with said input gear.

9. Apparatus as claimed in claim 1, said input gear mounted about said supply reel and said second control means including a brake and a gear means linked with both said brake and said supply reel, the second force acting upon said brake and converted into the second torque by said gear means.

10. Apparatus as claimed in claim 9, said tension detecting means comprising a rotatable tension regulator and a band brake, said tension regulator in contact with the tape, said band brake secured to the tension regulator at one end and linked to said brake with variable tightness, said tension regulator biased in a first rotational direction and rotatable in an opposite direction against said bias in dependence upon the tape tension, wherein, when the tape tension is lower than a predetermined level, said tension regulator rotates due to the bias to cause said band brake to be linked relatively tightly to said brake to thereby cause a reduced torque to be transmitted to said supply reel by said gear means, and when said tape tension is higher than a predetermined level, said tension regulator rotates against the bias to cause said band brake to be linked relatively loosely to said brake to thereby cause an increased torque to be transmitted to said supply reel by said gear means.

11. Apparatus as claimed in claim 1, said second control means including a brake and a gear means linked with both said brake and said supply reel, the second force acting upon said brake and converted into the second torque by said gear means.

12. Apparatus as claimed in claim 11, said tension detecting means comprising a rotatable tension regulator and a band brake, said tension regulator in contact with the tape, said band brake secured to the tension regulator at one end and linked to said brake with variable tightness, said tension regulator biased in a first rotational direction and rotatable in an opposite direction against said bias in dependence upon the tape tension, wherein, when the tape tension is lower than a predetermined level, said tension regulator rotates due to the bias to cause said band brake to be linked relatively tightly to said brake to thereby cause a reduced torque to be transmitted to said supply reel by said gear means, and when the tape tension is higher than a predetermined level, said tension regulator rotates against the bias to cause said band brake to be linked relatively loosely to said brake to thereby cause an increased torque to be transmitted to said supply reel by said gear means.

13. Apparatus as claimed in claim 12, said gear means including an inner gear disposed on one of an interior surface of said brake or an exterior surface of said supply reel, a sun gear disposed on the other of said interior surface of said brake or said exterior surface of said supply reel, and a plurality of planet gears linked with both said sun gear and said inner gear.

14. Tape driving apparatus having a supply reel and a take-up reel for winding a tape transferred between both the reels, the apparatus comprising:

reel drive means for driving one of the take-up reel in a forward direction and the supply reel in a reverse direction;

first control means including an input gear and a friction element disposed between the input gear and the supply, reel for receiving a first force supplied from the reel drive means and for conveying the first force into a first torque transmitted to the supply reel to transfer the tape in the reverse direction;

tension detecting means positioned near the supply reel and in contact with the tape for generating a second force in response to tension of the tape during the transfer in the reverse direction; and a second control means for converting the second force into a second torque in inverse proportion to the tape tension and for transmitting the second torque to the supply reel;

wherein the supply reel is driven to transfer the tape in the reverse direction by a torque proportional to the first torque and the second torque.

15. A method for controlling tension of a tape transferred from a take-up reel to a supply reel in a reverse direction for winding the tape, comprising the steps:

generating a first force to transfer the tape in the reverse direction by rotating the supply reel;

converting the first force into a first torque and transmitting the first torque to the supply reel by friction felt;

generating a second force in response to tension of the tape by being in contact with the tape during the transfer;

converting the second force into a second torque in inverse proportion to the tape tension;

transmitting the second torque to the supply reel; and driving the supply reel by a torque proportional to the first torque and the second torque.

16. Tape driving apparatus having a supply reel and a take-up reel for winding a tape transferred between both the reels, the apparatus comprising:

forward drive means associated with said take-up reel for transferring the tape from said supply reel to said take-up reel in a forward direction by rotating the take-up reel;

reverse drive means associated with the supply reel for transferring the tape from the take-up reel to the supply reel in a reverse direction by rotating the supply reel;

first control means for receiving a first force supplied from the reverse drive means and for converting the first force into a first torque transmitted to the supply reel;

tension detecting means positioned near the supply reel and in contact with the tape for generating a second force in response to tension of the tape during the transfer in the reverse direction; and second control means for converting the second force into a second torque in inverse proportion to the tape tension and for transmitting the second torque to the supply reel;

wherein the supply reel is driven by a torque proportional to the first torque and the second torque;

said first control means comprising an input gear mounted about said supply reel and a drive force transference means disposed between supply reel and said input gear;

said reverse drive means comprising a drive gear and a relay gear, said relay gear interlocked with said input gear.

17. A tape driving apparatus comprising;

a supply reel;

a takeup reel;

an input gear disposed about said supply reel;

torque transference means for transferring torque from said input gear to said supply reel, said torque transference means comprising a friction element disposed between said input gear and said supply reel;

drive means for driving said input gear to have a first torque with the first torque of said input gear transferred directly to said supply reel by said torque transference means;

a brake drum;

gear means interlinking said brake drum and said supply reel;

a band brake linked to said brake drum with variable tightness; and a rotatable tension regulator disposed so as to be in contact with the tape, said band brake secured to the tension regulator at one end, said tension regulator biased in a first rotational direction and rotatable in an opposite direction against said bias in dependence upon the tape tension, the rotation of said tension regulator causing a corresponding variation in the tightness of said band brake about said brake drum; wherein, said gear means rotates in dependence upon the tightness of said band brake about said brake drum, the rotation of said gear means causing a second torque to be created and act upon said supply reel.

18. The apparatus recited in claim 17, said input gear including a plurality of axles, said gear means including an inner gear disposed on an interior surface of said brake drum, a sun gear disposed on an exterior surface of said supply reel, and a plurality of planet gears rotatably disposed on said axles and linked with both said sun gear and said inner gear.

19. The apparatus recited in claim 17, said supply reel including a reel boss and a reel table secured to said reel boss, said friction element disposed between said input gear and said reel boss.

20. The apparatus recited in claim 17, said input gear including a plurality of axles, said gear means including an inner gear disposed on an exterior surface of said supply reel, a sun gear disposed on an interior surface of said brake drum, and a plurality of planet gears rotatably disposed on said axles and linked with both said sun gear and said inner gear.

* * * * *